INVENTORS
Ernest C. Witzke
Clarence W. Wehmeyer
Emmett S. Brown

ATTORNEY

Nov. 16, 1954  E. C. WITZKE ET AL  2,694,385
SIZE IDENTIFIED MOUNTING MEANS
FOR FLOW RESTRICTING ORIFICES
Filed Oct. 6, 1952  5 Sheets-Sheet 2

INVENTORS
Ernest C. Witzke
BY   Clarence W. Wehmeyer
Emmett S. Brown

R. F. Bryant
ATTORNEY

Nov. 16, 1954
E. C. WITZKE ET AL
2,694,385
SIZE IDENTIFIED MOUNTING MEANS
FOR FLOW RESTRICTING ORIFICES
Filed Oct. 6, 1952
5 Sheets-Sheet 3
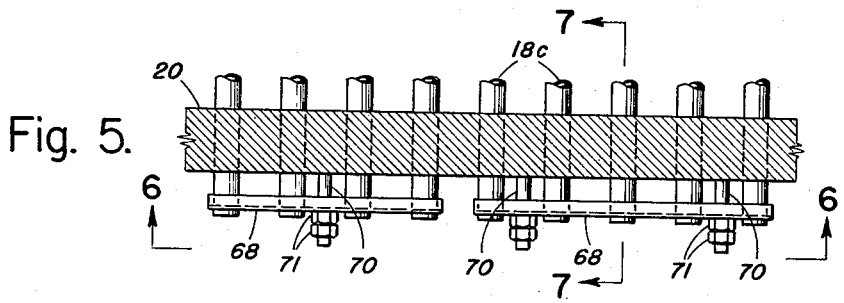
Fig. 5.
Fig. 6.
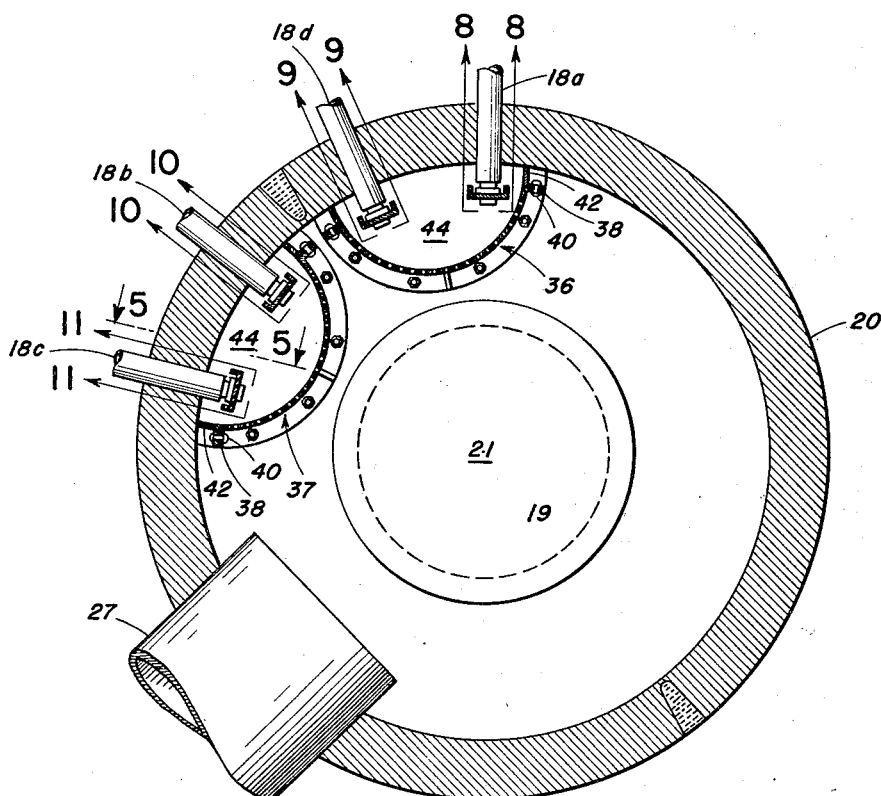
Fig. 4.
INVENTORS
Ernest C. Witzke
Clarence W. Wehmeyer
Emmett S. Brown
BY
ATTORNEY Nov. 16, 1954 E. C. WITZKE ET AL 2,694,385
SIZE IDENTIFIED MOUNTING MEANS
FOR FLOW RESTRICTING ORIFICES
Filed Oct. 6, 1952 5 Sheets-Sheet 4

INVENTORS
Ernest C. Witzke
Clarence W. Wehmeyer
Emmett S. Brown
BY
*Q. H. Bryant*
ATTORNEY Nov. 16, 1954

E. C. WITZKE ET AL
SIZE IDENTIFIED MOUNTING MEANS
FOR FLOW RESTRICTING ORIFICES 2,694,385

Filed Oct. 6, 1952

INVENTORS
Ernest C. Witzke
Clarence W. Wehmeyer
Emmett S. Brown
BY
*C. H. Bryant*
ATTORNEY 2,694,385

SIZE IDENTIFIED MOUNTING MEANS FOR FLOW RESTRICTING ORIFICES

Ernest C. Witzke, Bayside, Clarence W. Wehmeyer, White Plains, and Emmett S. Brown, Bellmore, N. Y., assignors to Combustion Engineering, Inc., New York, N. Y., a corporation of Delaware Application October 6, 1952, Serial No. 313,202

11 Claims. (Cl. 122—406)

Our invention relates generally to controlled circulation steam generators and has specific reference to such a generator employing orifices of various sizes for correct proportioning of the water through the various steam generating circuits and tubes with means for positively indexing said orifices with the tubes for which they have been preselected.

By the term "controlled circulation" is meant a steam generator having a positive or forced circulation through the various steam generating tubes and provided with means to proportion the water supply to said tubes, said proportioning means generally taking the form of orifices positioned at the inlets of said tubes. The ultimate purpose of the boiler designed in employing these orifices is to control the flow through the steam generating tubes in such a manner as to obtain a substantially equal circulation ratio in each tube.

"Circulation ratio" is defined as the weight rate of water fed to the steam generating tubes divided by the weight rate of steam generated therein, and ideal operation is obtained when this ratio is the same in each steam generating tube, as for example a ratio of 5 to 1 at which ratio there will be 4 lbs. of water leaving each steam generating tube for every pound of steam generated therein. Since the circulation ratio will vary in accordance with the amount of water flowing through the tubes as well as the length of the tube and the rate of heat absorption by the tube, it is apparent that these factors will govern the size of orifice required for each steam generating tube in a generator of this type.

It is the practice in designing controlled circulation steam generators to provide a plurality of steam generating circuits each of which is composed of a number of individual tubes so arranged in the furnace that each of the tubes in a single circuit has substantially the same rate of heat absorption as well as substantially the same length, wherefore the orifice needed by each such tube in a single circuit is of the same size as the orifice needed by every other tube in that circuit. However, since the tubes in different circuits have appreciably different rates of heat absorption and/or appreciably different lengths, the tubes of said different circuits require orifices that vary in flow restricting characteristics (and accordingly size) in order that the flow of water through all the tubes will be controlled in a manner to obtain the aforementioned desired substantially equal circulation ratio in each tube. Thus a single steam generating unit may require several different size orifices with a particular size orifice associated with a particular group of tubes in the unit.

The trend in the utility field is toward controlled circulation units of seemingly ever increasing capacity as is evidenced by the fact that the assignee of the instant application is now designed and erecting such a unit having a rated output of 1,055,000 lbs. of steam per hour; and for this reason the number of orifices employed in a single unit has become exceedingly large (approximately 876 being employed in said 1,055,000 lbs. per hour unit).

This tremendous number of orifices has given rise to an acute problem of positively identifying the particular orifices which are designed for the tubes of a particular steam generating circuit since, during periodic acid wash down as well as for inspection purposes all the orifices of the unit must be removed and thereafter reinstalled. Without some means for positively assuring that a particular orifice can be associated only with the tubes of the steam generating circuit for which it is designed the task of correctly replacing the orifices after removal is indeed exacting with the chance of error being ever present. Moreover, since orifice removal is not infrequent it is both necessary and desirable to mount the orifices in the generator in such a manner as to permit easy removal thereof.

The general object of our invention is to provide a controlled circulation boiler of improved design and construction particularly as concerns the orifice problems discussed hereinabove.

A more specific object is to provide a controlled circulation boiler employing several different size orifices with means positively indexing said orifices for association only with the tubes for which they are specifically designed.

A further object is to provide a controlled circulation boiler with readily removable means retaining the orifice in operative position at the inlets of the steam generating tubes.

Other and further objects of our invention will become apparent to those skilled in the art as the description hereof proceeds.

With the aforementioned objects in view our invention comprises an arrangement, construction and combination of the elements of the boiler in such a manner as to attain the results desired as hereafter more particularly set forth in the following detailed description of an illustrative embodiment; said embodiment being shown by the accompanying drawings wherein:

Fig. 4 is an enlarged transverse section of the orifice drum taken generally on line 4—4 of Fig. 2 and showing the internal construction of said drum including the strainers and tube orifices.

Fig. 5 is a sectional view taken generally along line 5—5 of Fig. 4 showing the arrangement for removably retaining the orifices in place at the inlet ends of the steam generating tubes.

Fig. 6 is an elevational end view taken generally along line 6—6 of Fig. 5 showing the orifice retaining means for a number of steam generating tubes.

Figure 8:
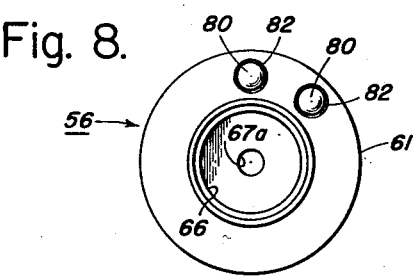
Fig. 8 is a view taken generally from line 8—8 of Fig. 4 with the retaining channels removed showing the orifice, the orifice mounting and the indexing means employed with the tubes of one steam generating circuit.
Figure 9:
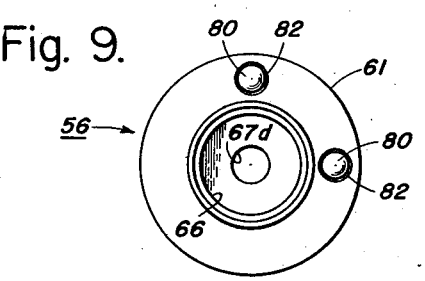
Figure 10:
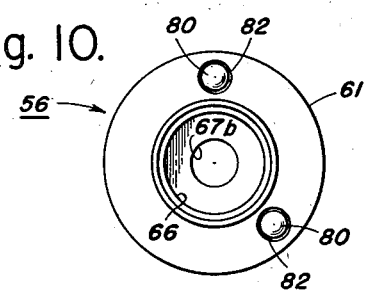
Figure 11:
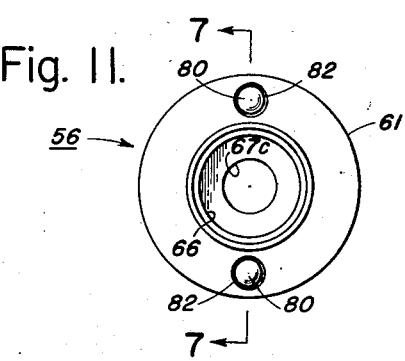

Figs. 9, 10 and 11 are views similar to that of Fig. 8 taken generally from lines 9—9, 10—10 and 11—11, respectively, of Fig. 4 showing the orifice, the orifice mounting and indexing means employed with the tubes of the other three steam generating circuits.

Figure 7:
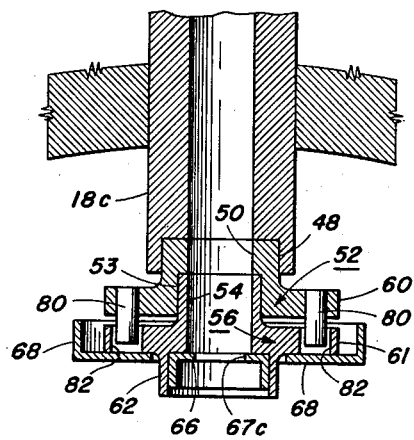
Fig. 7 is an enlarged sectional view taken generally along line 7—7 of Figs. 5 and 11 showing the details of the orifice mounting arrangement and the indexing means employed with the tubes of one steam generating circuit.
Figure 12:
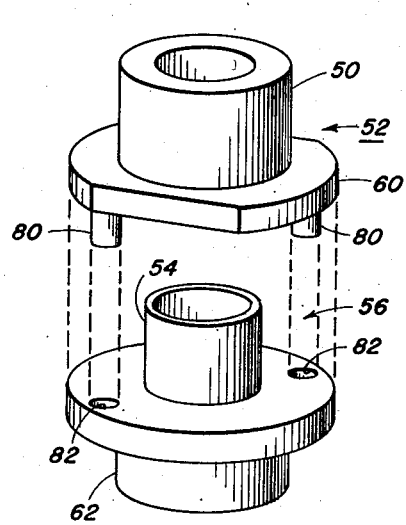

Fig. 12 is an exploded view showing the relative positioning of the orifice mounting and the adapter employed in the arrangement of Figs. 7 and 11.

Figure 13:
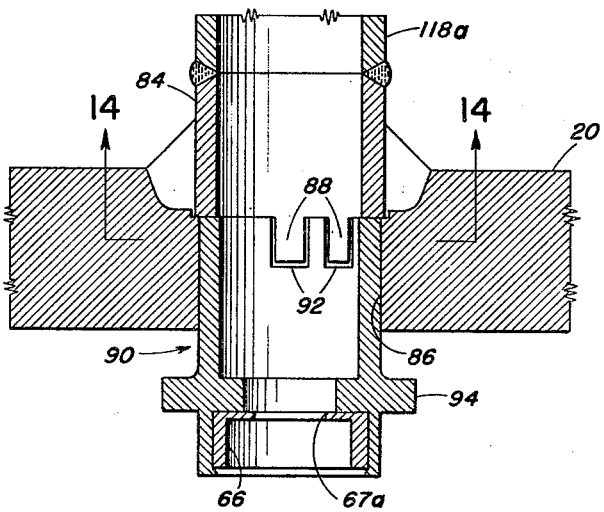

Fig. 13 is a longitudinal sectional view of a modified form of orifice mount and indexing means.

Figure 14:
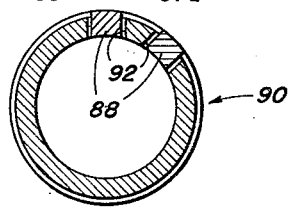

Fig. 14 is a sectional view taken generally along line 14—14 of Fig. 13.

Figure 15:
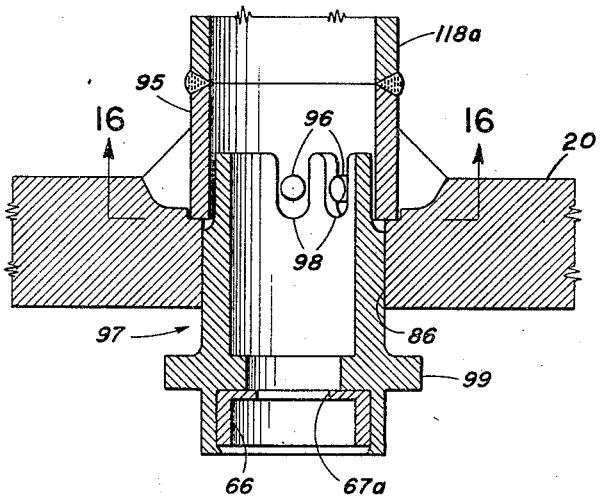

Fig. 15 is a longitudinal sectional view of another modified form of orifice mount and indexing means.

Figure 16:
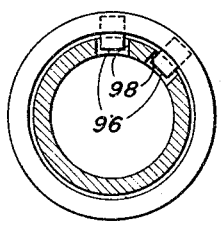

Fig. 16 is a sectional view taken generally along line 16—16 of Fig. 15.

While our orifice mounting and retaining means are herein shown and described as employed with a controlled circulation boiler having an orifice drum with which all of the steam generating tubes communicate it is to be understood that this is illustrative only and is not to be taken as restrictive; as the description proceeds it will become apparent our invention may equally well be employed with controlled circulation boilers of other designs as for example those having headers associated with each steam generating circuit or those employing a plurality of orifice drums in lieu of a single drum.

The steam generator illustrated

Figure 1:
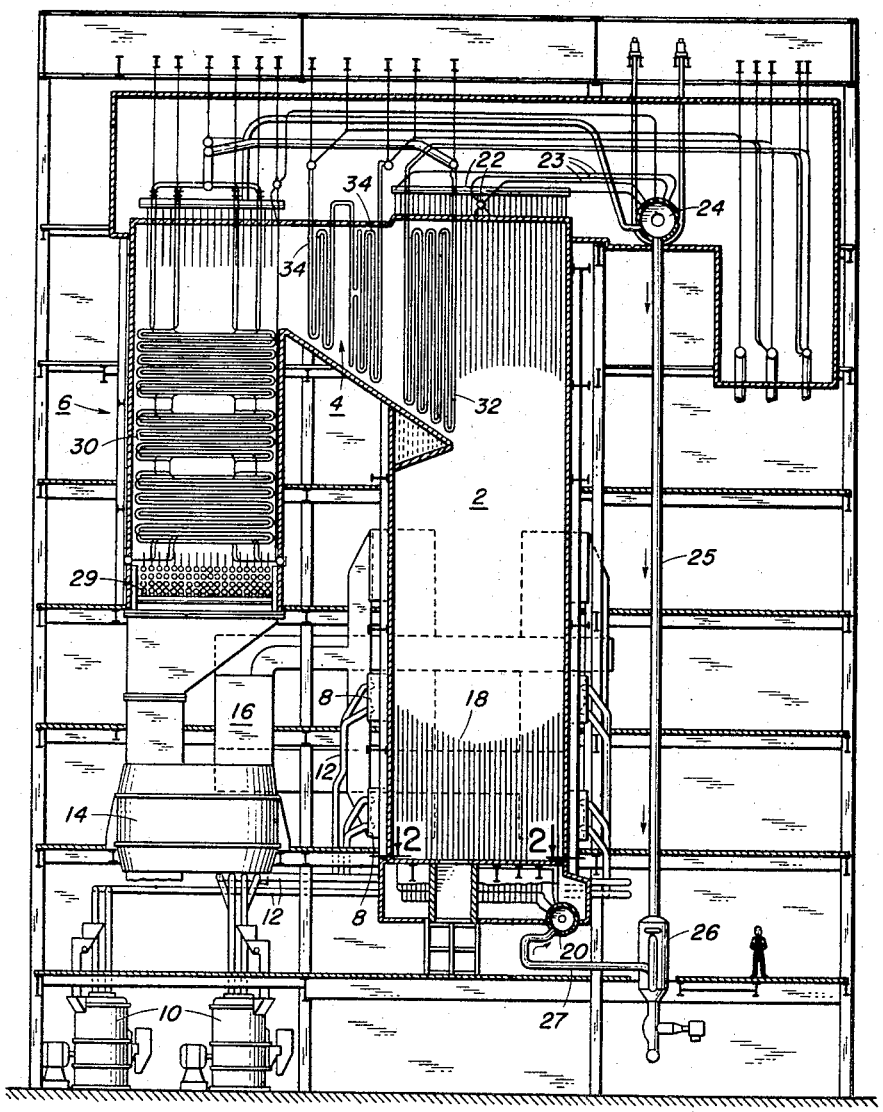
Fig. 1 is a vertical section of a modern controlled circulation steam generator.

Referring to the drawings, wherein like parts are designated by like reference characters, the steam generator of Fig. 1 comprises a vertically disposed furnace 2 of generally rectangular cross section communicating at its upper end with a horizontal gas pass 4 which in turn communicates with the upper end of a vertical gas pass 6 leading to air preheater 14. A plurality of vertically spaced burners 8 communicate with the interior of said furnace and are arranged to supply pulverized coal thereto from pulverizers 10 and conduits 12. Preheated air is introduced into the furnace under pressure via a suitable force draft fan (not shown) which forces the air through preheater 14 and duct 16 and thence into the furnace at a plurality of vertically spaced points; such introduction insuring complete burning of the fuel supplied through said burners.

Figure 2:
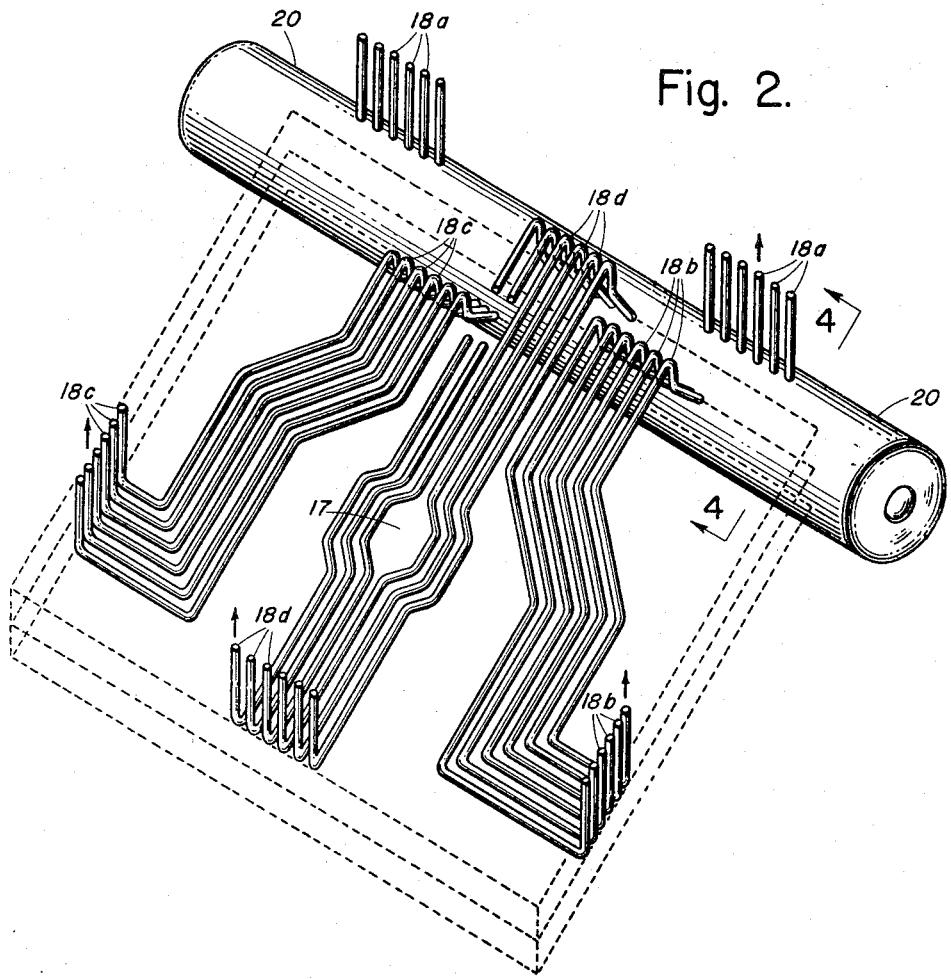
Fig. 2 is a perspective view (taken generally along line 2—2 of Fig. 1) showing the disposition of the tubes adjacent the lower portion of the furnace and their connection to the orifice drum.

Furnace 2 is of the water cooled type having the interior surface of its walls as well as the floor and ceiling lined with steam generating tubes designated generally 18 in Fig. 1. Said tubes 18 are connected at their lower or inlet ends with orifice drum 20 and at their upper ends with conventional headers 22 which in turn communicate with steam and water drum 24 through conduits 23. A plurality of downcomers 25 (only one being shown) depend from steam and water drum 24 and communicate at their lower ends with the inlet of pumps 26 (again only one being shown) which in turn have their outlets connected via conduits 27 to orifice drum 20 thereby completing a fluid circuit through which said pumps are effective to circulate the boiler water in a direction indicated by the arrows in Figs. 1 and 2. Orifice drum 20 is provided with manhole openings 19 at either end to permit entrance of workmen therewithin, said openings normally being closed by closure 21.

Since all the steam generating tubes lining a single side of a furnace generally have substantially the same rate of heat absorption and are of substantially the same length it will be assumed, for purposes of explanation that such is the case in the generator illustrated in Fig. 1 wherefore the tubes lining a single side of the furnace, when considered collectively, comprise a single steam generating circuit as hereinbefore defined. Said generator of Fig. 1 thus has four steam generating circuits (see Fig. 2) viz: (a) tubes 18a, lining the front wall of furnace 2, comprising one such circuit; (b) tubes 18b, lining one side wall of said furnace 2 comprising another such circuit; (c) tubes 18c, lining the other side wall, comprising the third such circuit; (d) and tubes 18d, lining the rear wall of the furnace, comprising the fourth such circuit. The tubes of all the circuits are connected to drum 20 at their inlets and extend therefrom to the various furnace walls in a manner best shown by Fig. 2. Tubes 18d in extending from drum 20 to the back wall of the furnace form the bottom of said furnace and are arranged to provide an access opening 17 therein.

The steam generator of Fig. 1 is provided with a plurality of heat exchange devices, namely: high temperature superheater 32, reheater 34, low temperature superheater 30, and economizer 29, disposed in the flow path of the hot combustion gases and connected with various elements of the generator in a conventional and well known manner.

The interior construction of orifice drum 20

Referring to Fig. 4 the inlets of the various steam generating tubes which project into the interior of drum 20 have orifices associated therewith in order to proportion the flow of water through each of said tubes in a manner and for the purposes hereinbefore explained. The particular means for mounting the orifices on the ends of said steam generating tubes and for retaining them in place during operation of the generator as described in detail hereinafter.

Figure 3:
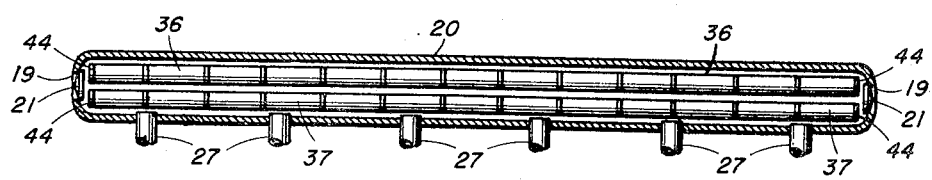
Fig. 3 is a view of the orifice drum with the casing broken away to show the longitudinally disposed strainers which cover the orifices that are provided for the four rows of entering tubes.

In order to prevent foreign matter which enters drum 20 from pumps 26 from clogging these orifices, strainers are provided to filter out said foreign matter before it can reach the orifices. In the illustrative form here shown said strainers comprise two elongated generally semicircular perforated members 36 and 37 extending longitudinally of drum 20 (see Fig. 3) and encompassing the inlets of tubes 18a and 18d and tubes 18b and 18c, respectively. Each of the perforated members 36 and 37 is provided with outwardly turned flange portions 38 which overlie and are removably bolted via bolts 40 to one leg of angle members 42 which members have their other leg welded to the inner surface of drum 20. Removable plates 44 (Figs. 3 and 4) seal the ends of said perforated members thereby completing the enclosure of the inlets of the steam generating tubes forcing the boiler water entering drum 20 through conduits 27 to pass through the openings in said perforated members before flowing through said orifices into said tubes.

The orifice mounting and indexing means

As previously pointed out all the tubes in a single steam generating circuit require the same size orifice in order to obtain a substantially equal circulation ratio in each tube while the tubes in different circuits require different size orifices. Thus in the illustrative steam generator of Fig. 1 four different size orifices are employed, one for each of the four steam generating circuits formed by tubes 18a, 18b, 18c and 18d, respectively. Although the orifices for the tubes of different circuits are of different size the arrangement for mounting the orifices on the inlet ends of the tubes in the illustrative organization shown is the same for all the circuits save for the indexing means hereafter described.

Referring specifically to said Figs. 5, 6 and 7 the inner extremity of each of the steam generating tubes is counterbored as at 48 to receive cylindrical extension 50 of adapter 52, which adapter is similarly counterbored as at 53 to loosely receive cylindrical extension 54 of orifice mount 56. Said adapter 52, which is secured to the ends of the tubes as by welding or other suitable means and said orifice mount 56 are provided with overlying radial flanges 60 and 61, respectively, and have centrally disposed passages extending therethrough of a diameter corresponding to the internal diameter of steam generating tubes 18. Orifice mount 56 has a reduced end portion 62 counterbored to receive orifice member 66 having an orifice (67c in the showing of Fig. 7) of predetermined size formed therein. The outer edge of said reduced end portion 62 is slightly peened or crimped after said orifice member is inserted thereinto thereby securing the orifice member within orifice mount 56.

In order to retain orifice mount 56 (with its orifice member 66) in place in adapter 52 during operation of the generator, channel members 68 (Figs. 5 and 6), of sufficient length to span a plurality of tubes in a single row, are suitably bored to receive reduced end portion 62 of orifice mount 56 in a way permitting the channel members 68 to bear against the flange 61. Studs 70 are welded to the inner surface of drum 20 intermediate certain of the tubes 18 and pass through suitable openings provided in channel members 68. Nuts 71 threadedly received on the end of studs 70 retain said channel members in engagement with said flanges 61.

As previously pointed out during periodic acid wash down as well as for inspection purposes all the orifices of the unit must be removed and thereafter replaced. In order to remove the orifices from steam generator of Fig. 1 it is merely necessary for the workmen who enter drum 20 through manhole 19 to first remove elongated perforate members 36 and 37 from their position encompassing the ends of steam generating tubes 18 by unbolting the same from the fixed angle members 42 and thereafter remove channel members 68 from their position bearing against flange 61 of the orifice adapters by removing nuts 71 from studs 70. The orifice mounts with the orifices therein are then easily removed (generally falling) from the adapters since as previously explained they are merely loosely received within said adapters.

After the acid wash down and/or inspection is completed it is necessary to replace the orifices and in so doing it is essential that an orifice preselected for the tubes of a particular steam generating circuit be reinstalled only in a tube of that circuit. Without some means for preventing installation of the orifices of one circuit in the tubes of another circuit the task of reassembling the generator would be many times more difficult. This is especially true when it is considered that unskilled workmen generally perform the disassembling and assembling operations.

In order to eliminate any chances of associating an orifice designed for one circuit with the tubes of another circuit we provide indexing means positively identifying each orifice with the tubes of the circuit for which it is particularly designed. Figs. 7 through 12 disclose one preferred embodiment of our indexing means wherein two angularly spaced pegs 80 secured to flange 60 of adapter 52 are snugly but slidably received within two similarly spaced openings 82 in the flange 61 of orifice mount 56 when said orifice mount is inserted within said adapter as shown in Fig. 7. The angular spacing of the pegs and openings is preselected for the tubes of each circuit in a manner so that an orifice designed for one circuit can be associated only with a tube of that circuit. Thus the angular spacing of pins 80 and openings 82 for tubes 18a, which make up one circuit and which require an orifice 67a of predetermined size, may be 45° (Fig. 8); the angular spacing for tubes 18d, which make up another circuit and which require an orifice 67d of predetermined size, may be 90° (Fig. 9); the angular spacing for tubes 18b, which make up still another circuit and which require an orifice 67b of predetermined size, may be 135° (Fig. 10); and the angular spacing for tubes 18c which make up still another circuit and which require an orifice 67c of predetermined size, may be 180° (Figs. 7, 11 and 12). By spacing the pins and openings in this manner an orifice mount 56 having orifice member 66 with a preselected one of the orifices 67a, 67b, 67c or 67d provided therein can be inserted only in an adapter 52 secured to the inlet end of a tube for which the orifice was particularly designed, thereby eliminating any chance of erroneous assembling of the orifice once the steam generating unit has been erected with the orifices properly installed.

Two modified forms of orifice adapters and indexing means that may also be advantageously employed are disclosed in Figs. 13 and 15.

The embodiment of Fig. 13 comprises an adapter member 84 welded at one end to steam generating tube 118a and at the other end to the wall of orifice drum 20. The interior of said adapter 84 communicates with a suitable opening 86 extending through the drum wall with said adapter having two angularly spaced axially extending machined fingers 88 projecting into said opening adjacent the wall thereof. Loosely received within said opening 86 is orifice mount 90 having two similarly spaced relieved portions 92 snugly but slidably received said fingers. The extremity of orifice mount 90 projecting within the drum 20 is provided with an outwardly extending radial flange 94 for engagement with a channel member 68 to retain said orifice mount within opening 86 in operative relation with adapter 84. Fixedly mounted within orifice mount 90 is orifice member 66 having, in the illustrative showing of Fig. 13, an orifice 67a.

By preselecting the angular spacing of the fingers and relieved portions in the manner described relative to the pegs and openings of the embodiment of Figs. 7 through 12, the orifice designed for the tubes of a particular circuit can be associated only with the tubes of that circuit thereby eliminating the chance of erroneous assemblage of the orifices.

The embodiment of Fig. 15 is somewhat similar to that of Fig. 13 being provided with an adapter member 95 welded at one end to tube 118a and at the other end to the wall of drum 20 adjacent the outer edge of opening 86. However, in lieu of axial extending fingers this embodiment of our invention includes two angularly spaced pins 96 secured to adapter 95 and extending radially inwardly thereof for a predetermined distance. Orifice mount 97 is loosely received within opening 86 and is provided with a reduced portion which extends within adapter 95, said reduced portion having similarly angularly spaced slots 98 that snugly but slidably receive said pins 96. The outer end of orifice mount 97 is provided with an outwardly extending radial flange 99 for engagement with a retaining member as described in detail hereinbefore. Orifice member 66 is fixedly positioned within orifice mount 97 and, in the illustrative showing of Fig. 15, is provided with an orifice 67a of predetermined size.

In this modification indexing of the orifices of a particular size for the tubes of a particular circuit is obtained in a manner similar to the previously described embodiments by preselecting the angular spacing of the pins and slots of the tubes of a particular circuit with said spacing being different for tubes of different circuits.

Summary

From the foregoing it will be seen that we have provided a controlled circulation steam generator of improved design and construction having a plurality of steam generating circuits with a particular orifice specifically designed for the tubes of each circuit and including means to positively index the orifice preselected for a particular circuit in such a manner as to eliminate the possibility of its being installed in a tube of another circuit; that we have provided means for mounting and retaining the orifices in the inlets of the tubes in a manner to permit their removal with a minimum of effort and time; and that the means for indexing the same in the inlets of the tubes are of rugged construction yet extremely simple in design being readily adaptable to manufacturing processes.

While we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes and alterations as fall within the purview of our invention.

What we claim is:

1. A controlled circulation boiler including a plurality of steam generating tubes having orifice means associated with the inlets thereof with certain of said orifice means having orifices of preselected different sizes in order that the flow of boiler water through each of the tubes will be controlled in accordance with predetermined factors, said orifice means including mechanical indexing means with said indexing means associated with the tubes having orifices of preselected different sizes being unique so that only an orifice of preselected size for a particular tube can be associated with said tube.

2. A controlled circulation boiler including a plurality of steam generating circuits each of which is composed of at least one tube; orifice means associated with the inlets of said tubes in a manner to control the flow therethrough with the orifice means in different circuits having different size orifices as determined in accordance with predetermined factors; and mechanical indexing means for said orifice means constructed and arranged so that only the orifice of preselected size for a particular tube can be operatively associated with said tube.

3. In a controlled circulation boiler having a plurality of steam generating tubes the combination of restrictor means associated with the inlets of at least a number of said tubes with the restrictor means associated with certain of said tubes being of a different flow capacity than the restrictor means associated with others of said tubes in order to effectively control the flow through said tubes in accordance with predetermined factors, said restrictor means comprising a first member fixed to the tube and a second member including means to restrict fluid flow removably retained in juxtaposition to the first member, one of said members having angularly spaced projections directed toward the other member, said other member having similarly angularly spaced openings snugly but slidably receiving said projections when said members are juxtaposed as aforesaid, the angular spacing of the projections and the openings of restrictor means of different flow capacity being substantially different whereby a restrictor means of a particular capacity can be associated only with tubes for which it has been selected.

4. The combination defined in claim 3 wherein the angular spaced projections comprise pins secured to the one member and projecting toward the other member.

5. A controlled circulation boiler including a plurality of steam generating circuits, each of which is composed of at least one tube; orifice means associated with the inlets of said tubes in a manner to control the flow therethrough with the tubes in different circuits having different size orifices as determined in accordance with predetermined factors, each of said orifice means including a fixed adapter member associated with each of said inlets and an orifice mounting member carrying a flow controlling orifice and arranged in juxtaposition to said adapter member; and mechanical indexing means associated with said adapter member and with said mounting member and constructed and arranged so as to prevent all but the orifice preselected for a particular tube from being associated with said tube.

6. A controlled circulation boiler as defined by claim 5 wherein the indexing means comprises angularly spaced pegs secured to one of said members and correspondingly spaced openings provided in the other of said members arranged to receive said pegs with the angular spacing for the orifice means of different circuits being unique.

7. In a controlled circulation boiler, the combination of a plurality of steam generating circuits, each of which is composed of at least one tube; orifice means associated with the inlets of said tubes in a manner to control the flow therethrough with the tubes in different circuits having different size orifices as determined in accordance with a predetermined factors, said orifice means including a fixed adapter member associated with each of said inlets of said tubes; an orifice mounting member carrying a flow controlling orifice and having a portion of said mounting member loosely positioned within said adapter member; angularly spaced projections emanating from one of said members and extending toward the other of said members, the other of said members having correspondingly spaced openings adapted to receive said projections when said members are in their assembled position with said mounting member extending within said adapter member, the spacing of said openings and projections being the same for the orifice means associated with each tube in a single steam generating circuit but different for different steam generating circuits thereby insuring that the orifice preselected for one circuit cannot be operatively associated with another of said circuits; and means for retaining the orifice mounting member in assembled position within the adapter member.

8. In a controlled circulation boiler having a plurality of steam generating tubes the combination of restrictor means associated with the inlets of at least a number of said tubes with the restrictor means that are associated with certain of said number being of a different flow capacity than the restrictor means associated with others of said number in accordance with predetermined factors, each of said restrictor means comprising an adapter member fixed to a tube and having an outwardly projecting radial flange at the end remote from said tube, a mounting member carrying a restrictor element and having a portion of said mounting member loosely positioned within said adapter, said mounting member being provided with an outwardly projecting radial flange overlying the flange of said adapter when the two members are in their assembled position, angularly spaced pegs secured to one of said flanges and extending toward the other flange, said other flange having correspondingly spaced openings snugly but slidably receiving said pegs when said members are in the assembled position, the angular spacing of the pegs and openings of restrictor means of different flow capacity being substantially different whereby a restrictor means of a particular capacity can be associated only with tubes for which it has been selected, and removable means engaging the flange of the mounting member retaining the same in assembled position during operation of the boiler.

9. In a controlled circulation boiler having a plurality of steam generating tubes the combination of restrictor means associated with the inlets of at least a number of said tubes with the restrictor means that are associated with certain of said number being of a different flow capacity than the restrictor means associated with others of said number in order to effectively control the flow through said tubes in accordance with predetermined factors, said restrictor means comprising a first member fixed to the inlet end of a tube and a second member including means to restrict fluid flow removably retained in juxtaposition to the first member, one of said members having integral angularly spaced machined fingers projecting towards the other member, said other member having similarly angularly spaced relieved portions snugly but slidably receiving said fingers when said members are juxtaposed as aforesaid, the angular spacing of the fingers and the relieved portions of restrictor means of different flow capacity being substantially different whereby a restrictor means of particular capacity can be associated only with the tubes for which it has been selected.

10. In a controlled circulation boiler having a plurality of steam generating tubes the combination of restrictor means associated with the inlets of at least a number of said tubes with the restrictor means that are associated with certain of said number being of a different flow capacity than the restrictor means associated with others of said number in order to effectively control the flow through said tubes in accordance with predetermined factors, said restrictor means comprising a first member fixed to the inlet end of a tube and a second member, including means to restrict fluid flow, removably retained in juxtaposition to the first member with a portion thereof projecting a predetermined distance within said first member, one of said members having radially extending angularly spaced pins projecting towards the other member, said other member having similarly angularly spaced slots snugly but slidably receiving said pins when said members are juxtaposed as aforesaid with said second member projecting within said first member, the angular spacing of the pins and the slots of restrictor means of different flow capacity being substantially different whereby a restrictor means of a particular capacity can be associated only with the tubes for which it has been selected.

11. In an organization of the type described a plurality of tubes having their inlet ends connected to a fluid distribution manifold, means for forcing water through said manifold and into and through said tubes, the inlet ends of said tubes extending into the interior of the manifold and being aligned in rows, flow restrictor means associated with the inlets of said tubes in a manner to restrict the flow through the tubes with certain tubes having restrictor means of different capacity associated therewith than those of other tubes to restrict the flow through the tubes in accordance with predetermined factors, each of said restrictor means including an adapter member fixedly associated with one of said inlet ends, a restrictor mounting member carrying the flow restrictor and provided with a radially extending flange intermediate its extremities with one of its extremities loosely fitting within said adapter member; mechanical indexing means associated with said adapter member and said mounting member constructed and arranged to preclude the association of a restrictor preselected for said certain tubes with said other tubes; and means removably retaining said mounting members in an assembled position including perforate channel members of predetermined lengths adapted to receive the other extremity of a plurality of said mounting members and bear against said radial flanges, and means removably retaining said channel member in engagement with said radial flanges.

References Cited in the file of this patent

UNITED STATES PATENTS

| Number | Name | Date |
|---|---|---|
| 1,988,659 | La Mont | Jan. 22, 1935 |
| 2,013,829 | Keenan, Jr. | Sept. 10, 1935 |
| 2,578,831 | Patterson | Dec. 18, 1951 |
| 2,615,434 | Patterson et al. | Oct. 28, 1952 |

FOREIGN PATENTS

| Number | Country | Date |
|---|---|---|
| 450,114 | Italy | July 8, 1949 |